United States Patent
Kwon et al.

(10) Patent No.: US 9,399,419 B2
(45) Date of Patent: Jul. 26, 2016

(54) METHOD AND SYSTEM FOR MEASURING HEAD POSITION OF DRIVER

(71) Applicant: Hyundai Motor Company, Seoul (KR)

(72) Inventors: Gideok Kwon, Seoul (KR); Sung Un Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 230 days.

(21) Appl. No.: 13/967,641

(22) Filed: Aug. 15, 2013

(65) Prior Publication Data
US 2014/0291523 A1    Oct. 2, 2014

(30) Foreign Application Priority Data
Mar. 29, 2013    (KR) .................. 10-2013-0034858

(51) Int. Cl.
| | | |
|---|---|---|
| *G01J 5/02* | (2006.01) | |
| *B60N 2/48* | (2006.01) | |
| *B60N 2/00* | (2006.01) | |
| *B60N 2/02* | (2006.01) | |

(52) U.S. Cl.
CPC .............. *B60N 2/4805* (2013.01); *B60N 2/002* (2013.01); *B60N 2/4829* (2013.01); *B60N 2002/0268* (2013.01)

(58) Field of Classification Search
CPC ............ G01J 5/00; G01J 5/002; G01J 5/0025
See application file for complete search history.

(56) References Cited

U.S. PATENT DOCUMENTS

| | | | | |
|---|---|---|---|---|
| 6,026,340 A | * | 2/2000 | Corrado et al. ................. | 701/47 |
| 6,609,053 B1 | * | 8/2003 | Breed ............................. | 701/45 |
| 2008/0234899 A1 | * | 9/2008 | Breed et al. .................... | 701/47 |
| 2012/0032488 A1 | | 2/2012 | Noguchi et al. | |

FOREIGN PATENT DOCUMENTS

| | | |
|---|---|---|
| DE | 19814904 A1 * | 10/1999 |
| JP | 2005-517162 A | 6/2005 |
| JP | 2006-315636 A | 11/2006 |
| KR | 10-2009-0124333 | 12/2009 |
| KR | 10-2011-0057083 | 5/2011 |

OTHER PUBLICATIONS

English Translation of DE 19814904 A1, Karr et al., Oct. 1999.*

(Continued)

*Primary Examiner* — David Porta
*Assistant Examiner* — Mamadou Faye
(74) *Attorney, Agent, or Firm* — Mintz Levin Cohn Ferris Glovsky and Popeo, P.C.; Peter F. Corless (57) ABSTRACT

A method and system that measure the head position of a driver in a vehicle include an infrared lamp that is disposed on a driver B-pillar and transmits an infrared signal and an infrared receiving sensor that is disposed on a passenger A-pillar to receive infrared signal from the infrared lamp. In addition, a plurality of infrared lamps are disposed on the headrest of the driver's seat and transmit infrared signals and an infrared receiving sensor is disposed on a dashboard disposed in front of a steering wheel to receive infrared signals from the infrared lamps on the headrest. A controller operates the infrared lamps to transmit infrared signals and measures the head position of a driver based on infrared signals received by the infrared receiving sensors.

20 Claims, 5 Drawing Sheets

(56) References Cited

OTHER PUBLICATIONS

Hwang et al. "Seat Headrest Development to Detect the Head Position of Passenger", 2011.*

S. Hwang et al., The Korean Society of Automotive Engineers, "Seat Headrest Development to Detect the Head Position of Passenger", pp. 2409-2412 (2010).

* cited by examiner

METHOD AND SYSTEM FOR MEASURING HEAD POSITION OF DRIVER

CROSS-REFERENCE TO RELATED APPLICATION

This application claims priority to and the benefit of Korean Patent Application No. 10-2013-0034858 filed in the Korean Intellectual Property Office on Mar. 29, 2013, the entire contents of which are incorporated herein by reference.

BACKGROUND (a) Field of the Invention

The present invention relates to a method and system for measuring a vertical position and left and right positions of the head of a driver in a vehicle, using infrared lamps and infrared sensors.

(b) Description of the Related Art

Recently, a technology of recognizing the head position of a driver in a vehicle has been studied in depth, as interest improving safety and convenience of vehicles has risen. The head position of a driver is used as an important parameter in an algorithm that controls the operations of a headrest and a seat and the operation of an airbag to prevent drowsy driving or minimize damage to the driver's head and neck in an accident.

In the related art, the head position of a driver is calculated with respect to the front and rear positions of the driver seat, and accordingly, the position of the driver seat may be determined based on signals from a seat track position sensor that detects the front and rear positions of the driver seat and the head position of the driver may be determined from the determined position of the driver seat.

However, the head position of a driver may be different to determine based on the degree of inclination of the backrest and/or the position of the driver in the driver seat, even when the position of the driver seat does not change, and thus it may be difficult to precisely and accurately measure the head position of a driver.

A developed conventional method provides a headrest position adjusting device that includes a plurality of detecting electrodes disposed vertically in parallel on a seat headrest in a vehicle and detects capacitance between the head of a person in the seat and the headrest, a detection circuit that detects the vertical position of the head based on detection signals from the detecting electrodes, and a position adjusting unit that adjusts the position of the headrest based on the vertical position of the head according to the detection result from the detecting circuit, in which the position adjusting unit adjusts the position of the headrest, when the distance between the headrest and the head is the same as or less than a predetermined distance, and the position adjusting unit stops or moves the headrest to a predetermined position, when the distance between the headrest and the head is greater than the predetermined distance.

However, in the conventional method, the capacitance detecting electrode may fail, when static electricity is generated at the headrest and/or the head, and detection signals of a battery electrode may have an influence directly on the driver's head, potentially causing harm to human health. Further, this system may be unable to measure the left and right positions of the driver's head, even though it provides the detection circuit that detects the vertical position of a head based on the signals from the detection electrode and adjustment of the vertical position of the headrest, based on the vertical position of the head.

The above information disclosed in this section is only for enhancement of understanding of the background of the invention and therefore it may contain information that does not form the prior art that is already known in this country to a person of ordinary skill in the art.

SUMMARY

The present invention provides a method and system for measuring the head position of a driver having advantages of measuring the vertical position and the left and right positions of the driver head in a vehicle, using infrared lamps and infrared sensors.

Further, the present invention provides a system for measuring the driver head position which sets the amount of infrared rays received before a driver enters a vehicle as a default value in infrared sensing to overcome an external light interference of an infrared receiving sensor, when measuring the head position, using infrared lamps and infrared sensors.

Further, the present invention provides a system for measuring the head position of a driver which measures the vertical position and the left and right positions of the driver head in a vehicle, using infrared lamps and infrared sensors, and may adjust the vertical position of a headrest and/or a seat and a display angle of a cluster based on the measured head position of the driver.

An exemplary embodiment of the present invention provides a system for measuring the driver head position, which may include: an infrared lamp that is disposed on a driver B-pillar and transmits an infrared signal; an infrared receiving sensor that is disposed on a passenger A-pillar to receive infrared signal from the infrared lamp; at least two or more infrared lamps that are disposed on the headrest of the driver seat and transmit infrared signals; an infrared receiving sensor that is disposed on a dashboard disposed in front of a steering wheel to receive infrared signals from the infrared lamps on the headrest; and a controller that operates the infrared lamps to transmit infrared signals and measures the driver head position based on infrared signals received by the infrared receiving sensors.

The system for measuring the head position of a driver according to an exemplary embodiment of the present invention may further include a door switch that detects opening/closing of the driver seat door and a driver seat sensor that detects when a driver sits on the driver seat.

The controller may set the magnitude of the infrared signal received by the infrared receiving sensor at a reception default value of an infrared signal by operating the infrared lamp a predetermined number of times, when the driver seat door switch detects opening of the driver seat door. When it is determined that the driver is sitting on the driver seat by the driver seat sensor after the reception default value of an infrared signal is set, the controller may operate the infrared lamps during a predetermined time and measure the driver head position of the driver based on the infrared signals received by the infrared receiving sensor.

The at least two or more infrared lamps may be transversely disposed. The controller may operate the height of the headrest based on the result of measuring the position of the driver head. In addition, the controller may operate the display angle of a vehicle cluster based on the result of measuring the position of the driver head. The controller may operate the height of the driver seat in a vehicle based on the result of measuring the position of the driver head. Additionally, the controller may sequentially operate the at least two or more infrared lamps on the headrest and may operate the at least two or more infrared lamps on the headrest at specific modulated pulses, respectively.

As described above, according to an exemplary embodiment of the present invention, it may be possible to measure the vertical position and the left and right positions of the driver's head in a vehicle, using infrared lamps and infrared sensors. Further, according to an exemplary embodiment of the present invention, it may be possible to set the amount of infrared rays before a driver enters a vehicle as a default value in infrared sensing to overcome an external light interference, when measuring the head position using infrared lamps and infrared sensor.

Moreover, according to an exemplary embodiment of the present invention, it may be possible to measure the vertical position and the left and right positions of a driver in a vehicle, using infrared lamps and infrared sensor, and to adjust the height of the headrest and the seat and adjust the display angle of the cluster based on the measured head position of the driver.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described more fully hereinafter with reference to the accompanying drawings, in which exemplary embodiments of the invention are shown. However, the present invention is not limited to the exemplary embodiments described herein and may be embodied in other ways. Throughout the present specification, unless explicitly described otherwise, "including" any components will be understood to imply the inclusion of other components rather than the exclusion of any other components.

Figure 1:
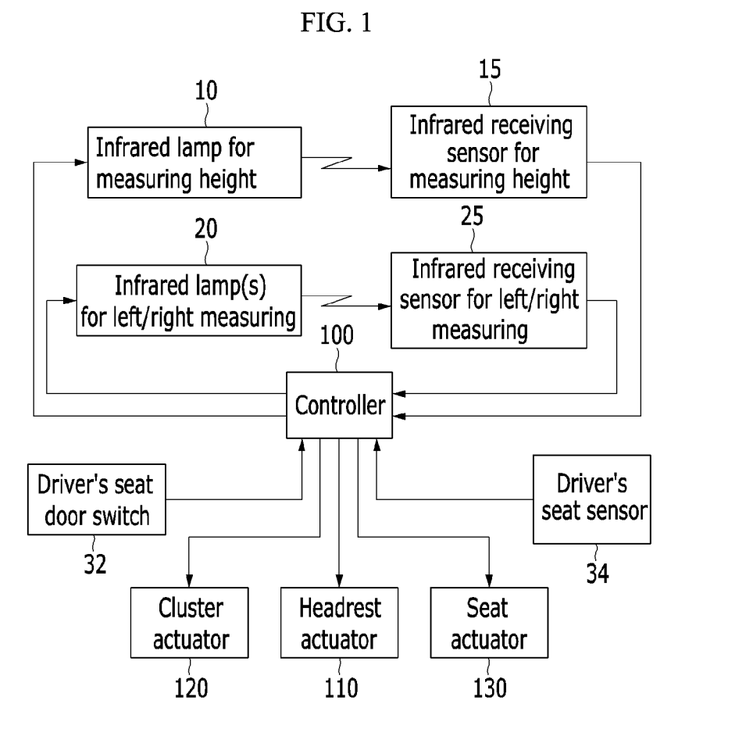
FIG. 1 is an exemplary schematic diagram of a system for measuring the position of a driver head according to an exemplary embodiment of the present invention.
Figure 2:
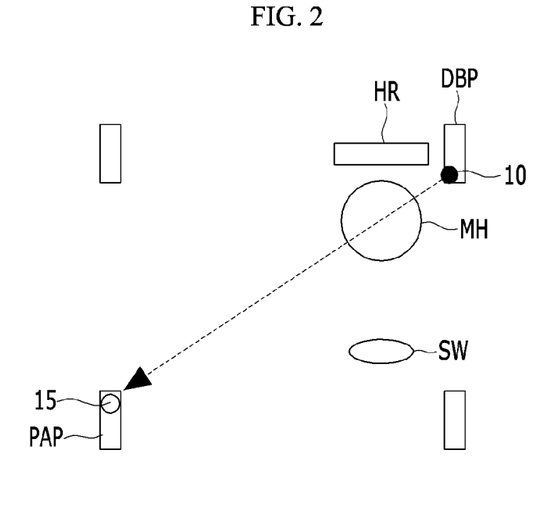
FIG. 2 is an exemplary top plan view showing the installation positions of components for measuring the vertical position of a head in the system for measuring the position of a driver head according to an exemplary embodiment of the present invention.
Figure 3:
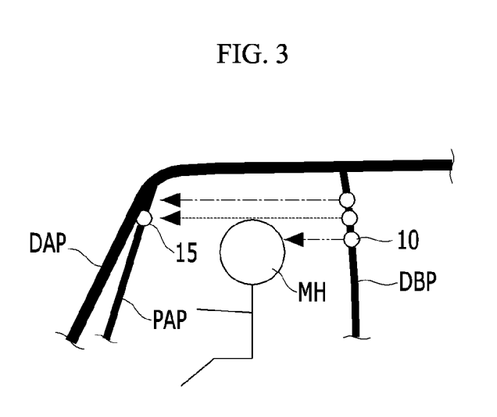
FIG. 3 is an exemplary side view showing the installation positions of the components for measuring the vertical head position in the system for measuring the position of a driver head according to an exemplary embodiment of the present invention.

FIG. 1 is an exemplary schematic diagram of a system for measuring the position of a driver's head according to an exemplary embodiment of the present invention. FIGS. 2 to 5 are exemplary views showing the installation positions of components in the system for measuring the position of a driver's head according to an exemplary embodiment of the present invention.

A method and system for measuring the head position of a driver according to an exemplary embodiment of the present invention is a system that may measure the vertical position and the left and right positions of a driver in a vehicle, using infrared lamps and infrared sensors.

The system for measuring the position of a driver's head according to an exemplary embodiment of the present invention may include: an infrared lamp 10 disposed on a driver B-pillar (DBP) and transmits an infrared signal; an infrared receiving sensor 15 disposed on a passenger A-pillar (PAP) to receive infrared signal from the infrared lamp 10; at least two or more infrared lamps 20 disposed on the headrest (HR) of the driver's seat and transmit infrared signals; an infrared receiving sensor 25 disposed on a dashboard (DB) disposed in front of a steering wheel (SW) to receive infrared signals from the infrared lamps 20 on the headrest (HR); and a controller 100 that operates the infrared lamps 10 and 20 to transmit infrared signals and measures the position of a driver's head based on infrared signals received by the infrared receiving sensors 15 and 25.

The system for measuring the position of a driver's head according to an exemplary embodiment of the present invention may further include a door switch 32 that detects an opening and a closing of the driver's seat door and a driver's seat sensor 34 that detects that a driver has sat on the driver's seat. In addition, the system may further include an electric actuator 110 that adjusts the height of a headrest, an electric actuator 120 that adjusts the display angle of a cluster, and an electric actuator 130 that adjusts the height of a seat.

The infrared lamp 10 may be, for example, an infrared Light Emitting Diode (LED) in an exemplary embodiment of the present invention, but it should be understood that the scope of the present invention is not limited thereto. The spirit of the present invention may be applied to any device that can emit infrared light, corresponding to an infrared LED, even if it is not an infrared LED.

The position where the infrared lamp 10 is installed may be based on a common position of the drivers' head. For example, the infrared lamp 10 may be positioned on the driver B-pillar (DBP), where an infrared signal reflects from the area around the center of the driver's head (MH).

The infrared receiving sensor 15 may be, for example, a sensor that may sense and receive an infrared signal in an exemplary embodiment of the present invention. The infrared receiving sensor 15 may be disposed at a height corresponding to the height of the infrared lamp 10, on the passenger B-pillar (PAP). The infrared lamps 20 disposed on the headrest (HR) may be, for example, infrared LEDs in an exemplary embodiment of the present invention, but it should be understood that the scope of the present invention is not limited thereto. The spirit of the present invention may be applied to any device that can emit infrared light, corresponding to an infrared LED, even if it is not an infrared LED.

Figure 4:
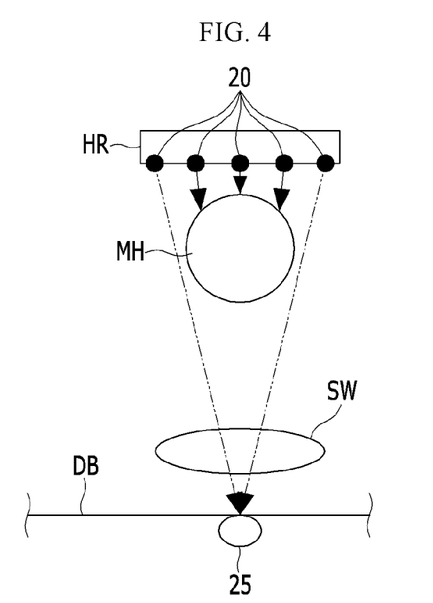
FIG. 4 is an exemplary top plan view showing the installation positions of components for measuring the left and right head positions in the system for measuring the position of a driver head according to an exemplary embodiment of the present invention.
Figure 5:
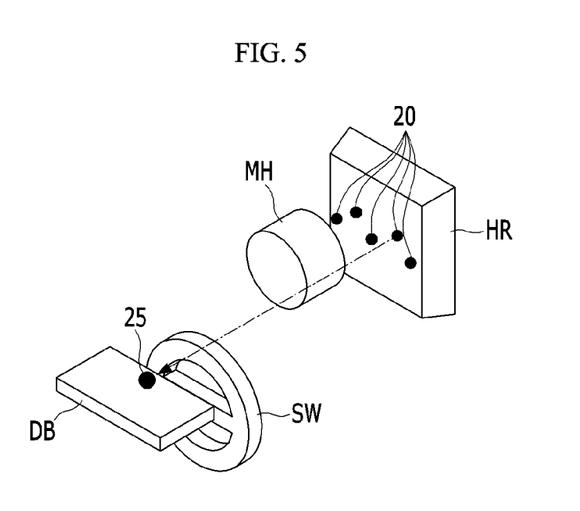
FIG. 5 is an exemplary side view showing the installation positions of the components for measuring the left and right head positions in the system for measuring the position of a driver head according to an exemplary embodiment of the present invention.

The infrared lamps 20 disposed on the headrest (HR) may be transversely arranged, as shown in FIGS. 4 and 5. Additionally, the infrared lamps 2 may be arranged in a line, or in zigzag, as shown in FIG. 5, transversely on the headrest (HR).

The infrared receiving sensor 25 that receives infrared signals from the infrared lamps 20 on the headrest (HR) may be disposed, for example, on the dashboard (DB) positioned in front of the steering wheel (SW) in an exemplary embodiment of the present invention. The driver's seat door switch 32 may be a switch that is turned on and off when the driver's door is opened and closed, but it should be understood that the scope of the present invention is not limited thereto. The spirit of the present invention may be applied to any switch as long as it detects opening and closing the driver's seat door. The driver's seat sensor 34 may be, for example, an on/off switch that outputs an ON-signal or an OFF-signal, when a driver sits on the driver's seat in an exemplary embodiment of the present invention, but it should be understood that the scope of the present invention is not limited thereto. The spirit of the present invention may be applied to other devices, even if they are different, as long as they can detect that a driver is sitting on the driver's seat.

The electric actuator 110 that adjusts the height of the headrest, the electric actuator 120 that adjusts the display angle of a cluster, and the electric actuator 130 that adjusts the height of a seat may be operated by an electric motor or a solenoid valve in an exemplary embodiment of the present invention, but it should be understood that the scope of the present invention is not limited thereto. Even if other configurations are different, the spirit of the present invention may be applied to the configurations as long as they can electrically adjust the height of the headrest (HR), the display angle of a cluster, and the height of a seat.

The controller 100 may include one or more microprocessors and/or hardware which are operated by a predetermined program. The operation of the system for measuring the position of a driver's head according to an exemplary embodiment of the present invention is described hereafter with reference to FIGS. 1 to 5.

The controller 100 may be configured to operate the infrared lamp 10 a predetermined number of times (e.g., three times), when the driver's seat door switch 3 detects an opening of the driver's seat door. In addition, the controller 100 may transmit a modulated infrared pulse signal, when operating the infrared lamp 10. When infrared signals are transmitted from the infrared lamp the predetermined number of times by the controller 100, the infrared signals transmitted from the infrared lamp 10 may be received by the infrared receiving sensor 15 without an external interference, since a driver may not have entered the vehicle.

When the infrared receiving sensor 15 receives the infrared signal transmitted from the infrared lamp 10, the controller 100 may be configured to set the magnitude of the infrared signal received by the infrared receiving sensor 15 as a reception default value of an infrared signal. Accordingly, an exemplary embodiment of the present invention may overcome the influence of an external light interference when measuring the head position based on an infrared signal. The reception default value of the infrared receiving sensor 25 for measuring the left and right positions of a driver may be set in the same way according to the method of setting a reception default value of the infrared receiving sensor 15 for measuring the height of the driver's head.

After setting the reception default value of an infrared signal, as described above, the controller 100 may be configured to determine whether a driver is sitting on the driver's seat using the driver's seat sensor 34 (e.g., a sitting motion is detected on the driver's seat). When a sitting motion is sensed on the driver's seat, the controller 100 may be configured to operate the infrared lamps 10 and 20 for a predetermined time (e.g., about 3 seconds) to allow the infrared lamps 10 and 20 to transmit modulated infrared signals.

The controller 100 may be configured to calculate the amount of infrared signals received by the infrared receiving sensors 15 and 25, after operating the infrared lamps 10 and 20 to transmit infrared signals. For example, when the calculated amount of infrared signals received by the infrared receiving sensor 15 is about 90-100% of the transmitted infrared signals, the controller 100 may be configured to determine that the driver's head position is not at the corresponding height.

When it is determined that the driver's head position is not at the corresponding height, the controller 100 may be configured to operate the headrest actuator 110 based on the calculated amount of the received infrared signals, to adjust the height of the headrest (HR) to fit the head of the driver. The controller 100 may be configured to adjust the height of the seat to allow the head (MH) of the driver to fit the headrest (HR) by operating the seat actuator 130, and may be configured to adjust the display angle of the cluster to fit the head (MH) of the driver by operating the cluster actuator 120.

Further, the controller 100 may not be configured to operate the headrest actuator 110 and/or the seat actuator 130 and/or the cluster actuator 120, when the driver's head position (MH) is at the corresponding position, that is, positioned to fit the headrest (HR), when the calculated amount of infrared signals received by the infrared receiving sensor 15 is about 0% of the transmitted infrared signals.

Further, when the calculated amount of infrared signals received by the infrared receiving sensor 15 is about 1-90% of the transmitted infrared signals, the controller 100 may be configured to determine that, but hair or other hair accessories are at the corresponding height. When it is determined that hair or other hair accessories (e.g., objects other than the driver's head position) are at the corresponding height, the controller 100 may be configured to adjust the headrest (HR) and/or the seat and/or the cluster to be suitable for the safety and convenience in use by operating the headrest actuator 110 and/or the seat actuator 130 and/or the cluster actuator 120 based on the amount of the received infrared signals.

On the other hand, the controller 100 may be configured to determine that the driver's head position (MH) is inclined to the right, when the infrared lamps 20 at the left side of the headrest (HR) receive the transmitted infrared signals and the infrared lamps 20 at the right side fail to receive the transmitted infrared signals, as the result of detecting the received signals of the infrared receiving sensor 25 on the dashboard (DB). In contrast, the controller 100 may be configured to determine that the driver's head position (MH) is inclined to the left, when the infrared lamps 20 at the left side of the headrest (HR) fail to receive the transmitted infrared signals and the infrared lamps 20 at the right side receive the transmitted infrared signals, as the result of detecting the received signals of the infrared receiving sensor 25 on the dashboard (DB). Further, the controller 100 may be configured to determine that the driver's head position (MH) is at the substantial center of the headrest (HR), when the infrared lamps 20 at the left and right sides of the headrest (HR) receive the substantially same amount of transmitted infrared signals or fail to receive any signal, as the result of detecting the received signals of the infrared receiving sensor 25 on the dashboard (DB).

Since only one infrared receiving sensor 25 may be disposed on the dashboard (DB), the controller 100 may be configured to operate the infrared lamps 20 sequentially from the right side for a predetermined time to detect the position of the infrared lamps 20 on the headrest (HR). Alternatively, the controller 100 may be configured to detect the position of the infrared lamps 20 on the headrest (HR) by operating the infrared lamps 20 to transmit specific modulated infrared pulse signals, respectively.

When the left and right positions of the driver's head are measured, as described above, the controller 100 may be configured to operate the headrest actuator 110 and/or the seat actuator 130 and/or the cluster actuator 120 to fit the measured left and right position of the driver's head.

Therefore, according to an exemplary embodiment of the present invention, it may be possible to measure the vertical position and the left and right positions of the position of a driver's head in a vehicle, using infrared lamps and infrared sensor, and it may be possible to operate the positions of a headrest, a seat, and/or a cluster to fit the position of the head of the driver.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

Description of symbols

10: Infrared lamp for measuring height
15: Infrared receiving sensor for measuring height
20: Infrared lamp(s) for left/right measuring
25: Infrared receiving sensor for left/right measuring
32: Driver's seat door switch
34: Driver's seat sensor
110: Headrest actuator
120: Cluster actuator
130: Seat actuator

What is claimed is:

1. A system for measuring the head position of a driver, comprising:
    an infrared lamp disposed on a driver B-pillar and is configured to transmit an infrared signal;
    an infrared receiving sensor disposed on a passenger A-pillar to receive infrared signal from the infrared lamp disposed on the driver B-pillar;
    a plurality of infrared lamps disposed on the headrest of the driver's seat and configured to transmit infrared signals;
    an infrared receiving sensor disposed on a dashboard disposed in front of a steering wheel to receive infrared signals from the infrared lamps on the headrest; and
    a controller configured to operate the infrared lamps to transmit infrared signals and measure the head position of a driver based on infrared signals received by the infrared receiving sensors.

2. The system of claim 1, further comprising:
    a door switch configured to detect an opening and a closing of the driver's seat door;
    a driver's seat sensor configured to detect a sitting motion on the driver's seat,
    wherein the controller is configured to set a magnitude of the infrared signal received by the infrared receiving sensor at a reception default value of an infrared signal by operating the infrared lamp a predetermined number of times, when the driver's seat door switch detects the opening of the driver's seat door.

3. The system of claim 2, wherein the controller is further configured to operate the plurality of infrared lamps a predetermined time and measure the head position of the driver based on the infrared signals received by the infrared receiving sensor in response to determining the sitting motion on the driver's seat after the reception default value of an infrared signal is set.

4. The system of claim 1, wherein the plurality of infrared lamps are transversely disposed.

5. The system of claim 3, wherein the controller is further configured to operate the height of the headrest based on the result of measuring the head position of the driver.

6. The system of claim 3, wherein the controller is further configured to operate the display angle of a cluster in a vehicle based on the result of measuring the head position of the driver.

7. The system of claim 3, wherein the controller is further configured to operate the height of the driver's seat in a vehicle based on the result of measuring the head position of the driver.

8. The system of claim 3, wherein the controller is further configured to sequentially operate the plurality of infrared lamps on the headrest.

9. The system of claim 3, wherein the controller is further configured to operate the plurality of infrared lamps on the headrest at specific modulated pulses, respectively.

10. A method for measuring the head position of a driver, comprising:
- transmitting, by an infrared lamp disposed on a driver B-pillar, an infrared signal to an infrared receiving sensor disposed on a passenger A-pillar;
- transmitting, by a plurality of infrared lamps disposed on the headrest of the driver's seat, infrared signals to an infrared receiving sensor disposed on a dashboard disposed in front of a steering wheel;
- operating, by a controller, the infrared lamps to transmit infrared signals; and
- measuring, by the controller, the head position of a driver based on infrared signals received by the infrared receiving sensors,.
- wherein the infrared signal transmitted by the infrared lamp disposed on the driver B-pillar is received by the infrared receiving sensor disposed on the passenger A-pillar, and
- the infrared signals transmitted by the plurality of infrared lamps disposed on the headrest are received by the infrared receiving sensor disposed on the dashboard.

11. The method of claim 10, further comprising:
- detecting, by the controller, an opening and a closing of the driver's seat door using a door switch;
- detecting, by a driver's seat sensor, a sitting motion on the driver's seat; and
- setting, by the controller, a magnitude of the infrared signal received by the infrared receiving sensor at a reception default value of an infrared signal by operating the infrared lamp a predetermined number of times, when the driver's seat door switch detects the opening of the driver's seat door.

12. The method of claim 11, further comprising:
- operating, by the controller, the plurality of infrared lamps a predetermined time; and
- measuring, by the controller, the head position of the driver based on the infrared signals received by the infrared receiving sensor in response to determining the sitting motion on the driver's seat after the reception default value of an infrared signal is set.

13. The method of claim 12, further comprising:
- operating, by the controller, the height of the headrest based on the result of measuring the head position of the driver.

14. The method of claim 12, further comprising:
- operating, by the controller, the display angle of a cluster in a vehicle based on the result of measuring the head position of the driver.

15. The method of claim 12, further comprising:
- operating, by the controller, the height of the driver's seat in a vehicle based on the result of measuring the head position of the driver.

16. The method of claim 12, further comprising:
- sequentially operating, by the controller, the plurality of infrared lamps on the headrest.

17. The method of claim 12, further comprising:
- operating, by the controller, the plurality of infrared lamps on the headrest at specific modulated pulses, respectively.

18. A non-transitory computer readable medium containing program instructions executed by a controller, the computer readable medium comprising:
- program instructions that control an infrared lamp disposed on a driver B-pillar to transmit an infrared signal to an infrared receiving sensor disposed on a passenger A-pillar;
- program instructions that control a plurality of infrared lamps disposed on the headrest of the driver's seat to transmit infrared signals to an infrared receiving sensor disposed on a dashboard disposed in front of a steering wheel;
- program instructions that control the infrared lamps to transmit infrared signals; and
- program instructions that measure the head position of a driver based on infrared signals received by the infrared receiving sensors,.
- wherein the infrared signal transmitted by the infrared lamp disposed on the driver B-pillar is received by the infrared receiving sensor disposed on the passenger A-pillar, and
- the infrared signals transmitted by the plurality of infrared lamps disposed on the headrest are received by the infrared receiving sensor disposed on the dashboard.

19. The non-transitory computer readable medium of claim 18, further comprising:
- program instructions that detect an opening and a closing of the driver's seat door using a door switch;
- program instructions that control a driver's seat sensor to detect a sitting motion on the driver's seat; and
- program instructions that set a magnitude of the infrared signal received by the infrared receiving sensor at a reception default value of an infrared signal by operating the infrared lamp a predetermined number of times, when the driver's seat door switch detects the opening of the driver's seat door.

20. The non-transitory computer readable medium of claim 19, further comprising:
- program instructions that operate the plurality of infrared lamps a predetermined time; and
- program instructions that measure the head position of the driver based on the infrared signals received by the infrared receiving sensor in response to determining the sitting motion on the driver's seat after the reception default value of an infrared signal is set.

* * * * *